United States Patent [19]
Morris

[11] Patent Number: 5,705,071
[45] Date of Patent: Jan. 6, 1998

[54] PLEATED CERAMIC FILTER

[75] Inventor: Jay M. Morris, Cuba, N.Y.

[73] Assignee: Vesuvius Crucible Company, Wilmington, Del.

[21] Appl. No.: 689,924

[22] Filed: Aug. 16, 1996

[51] Int. Cl.$^6$ ................................................ B01D 27/06
[52] U.S. Cl. ................................ 210/493.1; 210/493.5; 210/510.1; 55/523
[58] Field of Search .................. 210/487, 493.1, 210/493.5, 493.2, 501, 510.1; 55/523

[56] References Cited

U.S. PATENT DOCUMENTS

| | | |
|---|---|---|
| 3,112,184 | 11/1963 | Hollenbach . |
| 3,272,686 | 9/1966 | Smith . |
| 4,251,239 | 2/1981 | Clyde et al. . |
| 4,290,889 | 9/1981 | Erickson ................ 210/510.1 |
| 4,568,595 | 2/1986 | Morris ................ 428/116 |
| 4,687,579 | 8/1987 | Bergman ................ 55/523 |
| 4,892,712 | 1/1990 | Robertson et al. ......... 210/510.1 |
| 5,075,160 | 12/1991 | Stinton et al. .......... 210/510.1 |
| 5,250,094 | 10/1993 | Chung et al. ............. 55/523 |
| 5,266,279 | 11/1993 | Haerle ................... 55/523 |

FOREIGN PATENT DOCUMENTS 1019807  2/1966  United Kingdom .

*Primary Examiner*—W. L. Walker
*Attorney, Agent, or Firm*—Webb Ziesenheim Bruening Logsdon Orkin & Hanson, P.C.

[57] ABSTRACT

A filter for removing solids from fluids has a three dimensional pleated refractory construct with a plurality of adjacent parallel angled walls. The opposed edge of each angled wall is integral with an edge of an adjacent angled wall to form upper apices and lower apices. An open mesh planar ceramic screen may be located adjacent to the upper and/or the lower apices of the pleated construct of the filter.

14 Claims, 2 Drawing Sheets

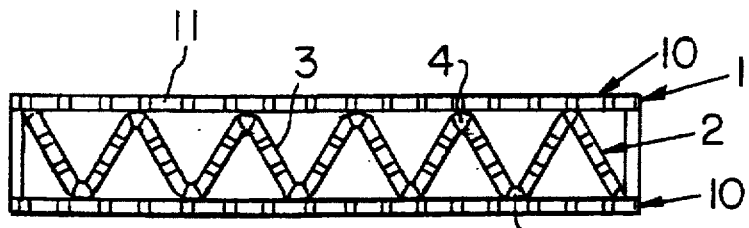
FIG. 1
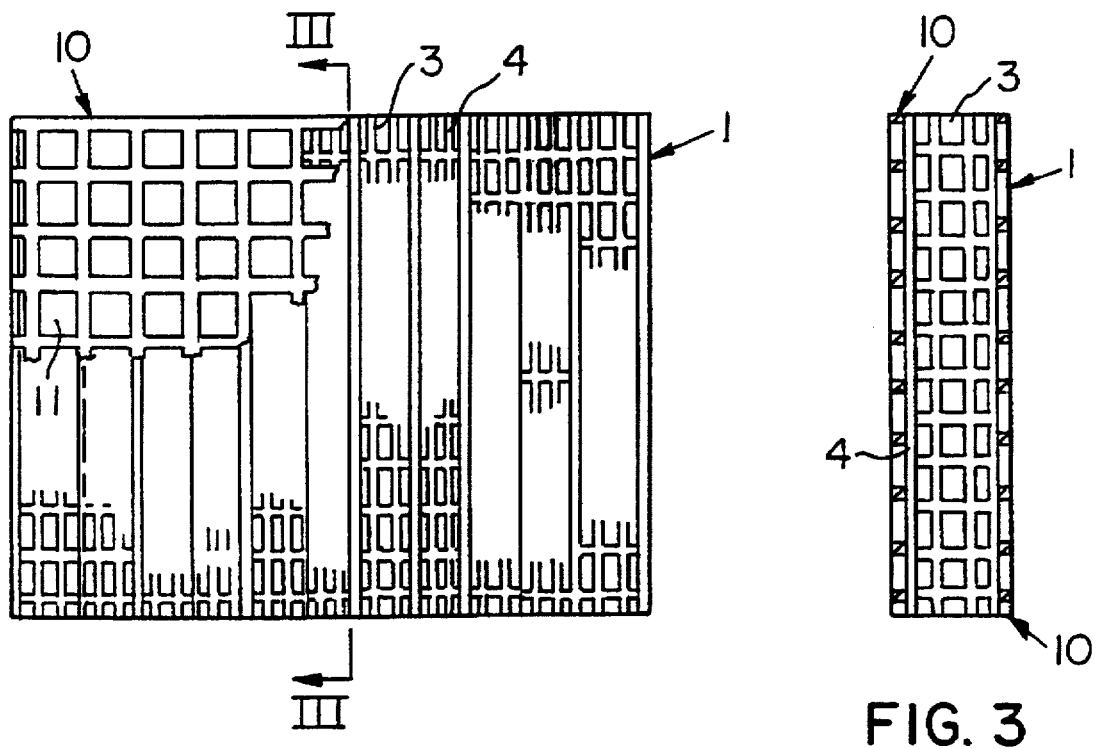
FIG. 2
FIG. 3
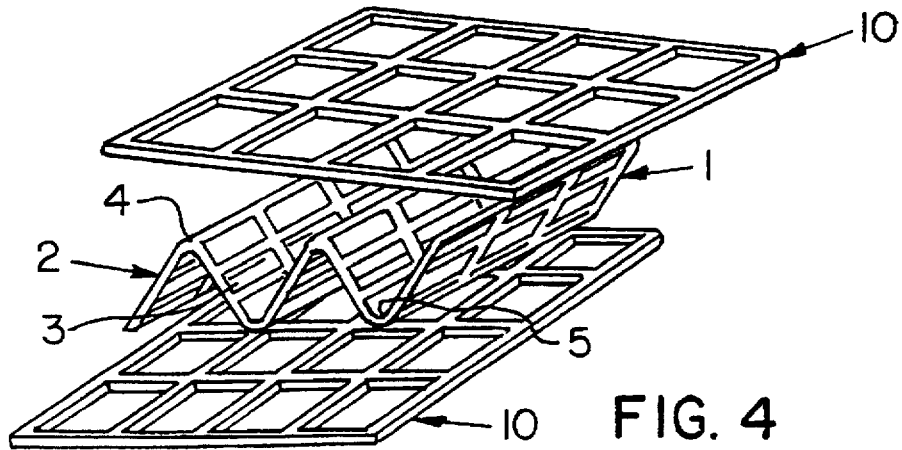
FIG. 4

PLEATED CERAMIC FILTER

BACKGROUND OF THE INVENTION

The invention is directed generally to a ceramic filter arrangement and particularly to a filter having a three dimensional pleated ceramic construct. An open mesh planar ceramic screen may be located adjacent to one or both sides of the pleated ceramic construct.

1. Field of the Invention

The invention is a filter which has a three dimensional pleated ceramic construct providing a continuous tortuous porosity intertwined with a three dimensional continuous dense ceramic. The pleated ceramic construct may be placed between two open mesh planar ceramic screens. The pore openings of the pleated ceramic construct of the invention are 0.1 inch to 2.0 inches as compared with the 0.01 inch to 0.1 inch pore openings in standard reticulated ceramic filters. The construct comprises a two-phase system wherein one phase is a dense ceramic in a continuous solid phase having a woven, screenlike pattern and the second phase is macro porous having a size determined by the tightness of the weave. The solid phase is a relatively inert ceramic material such as an elevated temperature resistant inorganic material which is usually an oxide, a carbide or the like. Filters of this type are useful for removing solid inclusions and impurities from fluids such as molten metals.

It is desirable to utilize ceramic materials which are relatively inert at elevated temperatures, resistant to corrosive environments and to rapid changes in temperature while maintaining the strength and structural integrity of the refractory materials. It is also desirable to maximize these properties while minimizing heat capacity and thermal conductivity. Sintered ceramic materials are available which generally have good strength at elevated temperatures and are relatively corrosion and erosion resistant.

2. Related Prior Art

U. S. Pat. No. 4,568,595 (hereinafter the '595 patent) entitled "Coated Ceramic Structure and Method of Making Same" discloses methods of manufacturing ceramic materials and the physical properties of certain ceramic materials. The disclosures of the '595 patent are incorporated herein by reference.

SUMMARY OF THE INVENTION

The invention is an improved three dimensional pleated ceramic construct which functions as a filter for removing solid impurities and inclusions from fluids such as molten metal. The pleated ceramic construct provides a filter having increased filter capacity and an increased flow rate of molten metal relative to the flow rate through prior art filters such as those disclosed in the '595 patent.

The three dimensional ceramic construct of the invention provides an open configuration which is made from a precursor material and partially stabilized zirconia ceramic materials. Other ceramic materials which may be used are lithium aluminosilicate, mullite, 98% alumina, 92% alumina, 90% alumina and other sinterable ceramics. Compositions for these ceramic materials are set forth in the '595 patent. The filter may include an open mesh planar ceramic screen adjacent to one or both surfaces of the three dimensional pleated ceramic construct.

The advantage of three dimensional pleated ceramic construct having an open vertical cross section relative to the presently available reticulated ceramic filters is the substantial increase in the open area. This results in an increase in the filtration capacity and in the flow rate of the molten metal passing through the filter. The pleated construct also reduces the back pressure or head required for molten metal to pass through the structure. The three dimensional pleated ceramic construct provides a filter which overcomes limitations dictated by the prior art precursors which are used to manufacture reticulated ceramic filters. The open precursor material used in the invention has pore sizes on the order of 0.1 inch to 2.0 inches whereas most commercially available ceramic molten metal filters have openings on the order of 0.1 inch. The increase in the pore size of the filter increases the flow rate of molten metal through the filter. The pleated construct will, in general, have a lower filtration efficiency than a 10 ppi filter (0.1 inch pore opening) but a significantly greater filtration capacity than the 10 ppi filter.

The three dimensional pleated ceramic construct provides a filter which is superior to a cellular, pressed or extruded flat screen filter and to a stack of individual flat screen filters. The three dimensional construct provides a more tortuous path than the one dimension construct of the prior art filters. This results in a greater interaction potential between inclusions in the molten metal and the ceramic filter as the molten metal flows through the filter. Additionally, the pleated construct has greater physical strength and a greater capacity to retain inclusions than the one dimension construct of the prior art filters.

The increase in capacity is important when filtering molten steel supplied to a continuous caster to remove solid impurities and inclusions from the molten steel. The use of the three dimensional pleated ceramic filters in continuous casters is extremely advantageous since these filters permit the filtration of quantities of molten steel in excess of 100,000 pounds.

In an alternative embodiment of the invention, an open mesh planar ceramic screen is located adjacent to at least the upper apices of the pleated construct. An open mesh planar ceramic screen can also be located adjacent to the lower apices of the pleated construct. The open mesh planar ceramic screens are made from plastic precursors which result in screens which are significantly more open than the 10 ppi ceramic filters which are now being used. The size of the openings in the screens can vary from 0.1 inch to 2.0 inches.

A complete understanding of the invention will be obtained from the following description when taken in connection with the accompanying drawing figures wherein like reference characters identify like parts throughout.

BRIEF DESCRIPTION OF THE DRAWINGS

FIG. 1 is an elevation of a filter according to the invention;

FIG. 2 is a broken plan view of the filter shown in FIG. 1;

FIG. 3 is a section on line III—III of FIG. 2;

FIG. 4 is an enlarged isometric view of the filter shown in FIG. 1;

DESCRIPTION OF PREFERRED EMBODIMENTS

Figure 5:
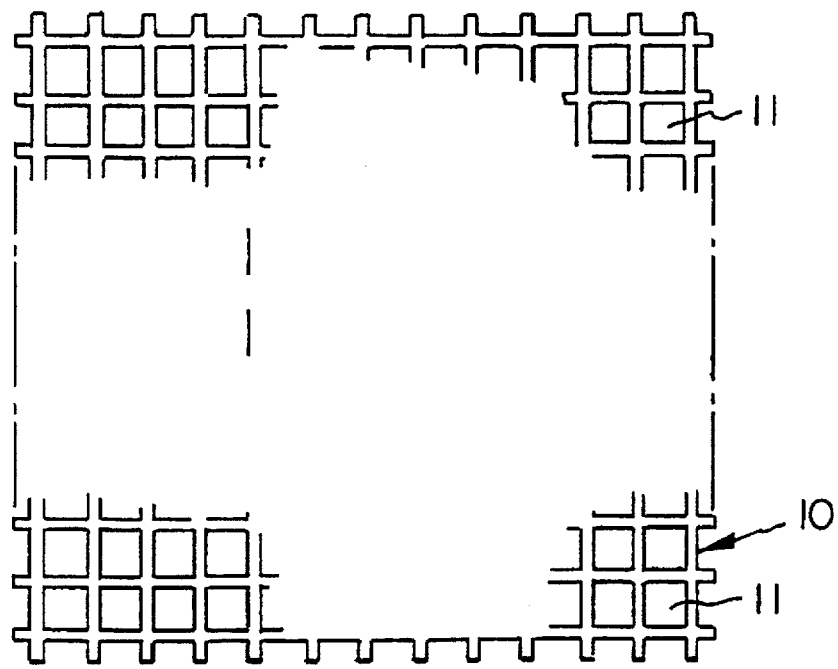
FIG. 5 is a broken plan view of a ceramic screen.

For purposes of description herein, the terms "upper", "lower","right","left", "rear","front", "vertical", "horizontal" and derivatives thereof relate to the invention as oriented in the drawing figures. However, it is to be understood that the invention may assume various alternative orientations and step sequences, except where expressly specified to the contrary. It is also to be understood that the specific devices and processes illustrated in the attached drawings and described in the following specification are merely exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1–3 of the drawings show a filter 1 having a three dimensional pleated ceramic construct 2 and upper and lower open mesh planar ceramic screens 10. The pleated construct 2 of the filter 1 is a continuous member having angular walls 3 connected at upper apices 4 and lower apices 5. An open mesh planar ceramic upper screen 10 overlies the top of the pleated construct 2 of the filter 1 and may be sintered to the apices 4. A lower open mesh planar ceramic screen 10 is located below the pleated construct 2 of the filter 1 and may be sintered to the lower apices 5 of the pleated construct.

The planar ceramic screens 10 are substantially identical and are formed by coating a plastic mesh precursor material with a slurry of a sinterable ceramic which is dried. One example of such a plastic mesh material is the mesh material used to make produce bags. The coated precursor is then fired at an appropriate temperature for an appropriate period of time to burn out the plastic precursor material and bond the ceramic material.

A plurality of filters 1 can be stacked, if desired, to provide a multiple layer filter having substantial tortuosity which functions as a single filter for molten metal flowing through the stack.

The planar screen 10 shown in FIG. 5 of the drawings has a plurality of substantially square through openings 11. The openings 11 can have various shapes other than square. The size and shape of the openings 11 in the planar screen 10 are selected in accordance with the desired cleanliness of the molten metal after filtering is completed and the desired flow rate and filtration capacity of the filter 1 of which the planar screen is a part. The size and shape of the openings in the planar screen 10 are determined by the openings in the precursor which is coated with the refractory material to form the screen. It has been determined that polymer screens which are made of common plastic materials such as polyurethane or polypropylene which are well known are acceptable materials for use as precursors for the formation of refractory screens. It will be obvious to one of ordinary skill in the art that the smaller mesh size screens decrease the flow rate through the filter while increasing the filtration efficiency, i.e., the ability to remove solid impurities and inclusions from the molten metal passing through the screen. The size of the openings in the pleated construct 2 of the filter 1 is selected in accordance with the flow rate of the molten metal from the continuous caster or other large flow source of molten metal with which the filter is used.

Figure 6:
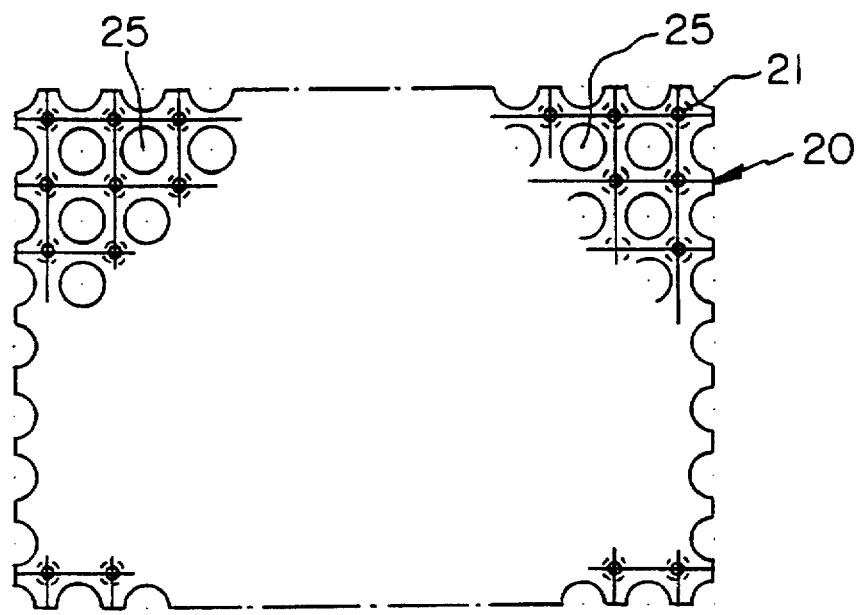
FIG. 6 is a broken plan view of an alternative type of ceramic screen.
Figure 7:
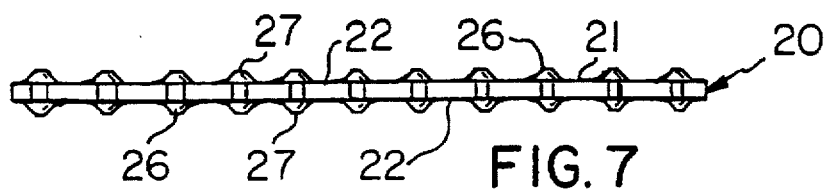
FIG. 7 is an elevation of the ceramic screen shown in FIG. 6.

FIGS. 6 and 7 of the drawings show a second embodiment of an open mesh planar ceramic screen 20 which may be used with the pleated portion 2 in a filter 1. The planar screen 20 has a base construct 21 with opposed surfaces 22. A plurality of substantially cylindrical through openings 25 are formed in the base construct 21 and protrusions 26 extend outwardly from the surfaces 22 of the base portion 21. The protrusions 26 are located between the through openings 25.

When screens 20 are stacked, the distal ends 27 of the protrusions 26 on the upper screen rest on the distal ends of the protrusions on the lower screen. This arrangement creates a tortuous path for the passage of molten metal through a stack of screens 20 prior to passing through the pleated ceramic construct 2 of the filter 1 and increases the filtration capacity of the overall filter arrangement.

The refractory screen 20 is formed from an appropriate precursor in the same way as the refractory screen 10 and surfaces of the distal ends 27 of the protrusions 26 on the screen 20 are in contact with the apices 4 or 5 of the pleated construct 2 of the filter 1.

It will be understood by those skilled in the art that an open mesh upper planar ceramic screen, a lower open mesh planar ceramic screen and a pleated construct can be formed with planar screens having the same configuration or having different configurations.

It will be readily appreciated by those skilled in the art that modifications may be made to the invention described in the foregoing description without departing from the concepts disclosed herein. Such modifications are to be considered as included within the following claims, unless the claims by their language expressly state otherwise. Accordingly, the particular embodiments are illustrative only and are not limiting as to the scope of the invention which is to be given the full breadth of the appended claims and any and all equivalents thereof.

I claim:

1. A rigid ceramic filter for removing solids from fluids, said filter comprising a three dimensional pleated sintered ceramic construct having an inlet side, an outlet side and a plurality of adjacent angled walls having a sintered ceramic open mesh structure and opposed substantially parallel edges, said opposed substantially parallel edges of each of said angled walls being integral with an edge of an adjacent angled wall to form an apex, whereby said pleated sintered ceramic construct has a plurality of adjacent angled walls joined at upper apices lying in a first plane and joined at lower apices lying in a second plane, wherein said first and second planes are substantially parallel, and a first open mesh planar sintered ceramic screen adjacent to said upper apices of said pleated construct, whereby said first open mesh planar sintered ceramic screen is located at said inlet side of said pleated construct and said plurality of sintered ceramic open mesh adjacent angled walls are located below said first open mesh planar sintered ceramic screen.

2. A filter as set forth in claim 1 wherein said open mesh structure of the pleated sintered ceramic construct has a pore size between 0.1 inch to 2.0 inches.

3. A filter as set forth in claim 2 wherein said first open mesh planar ceramic screen is sintered to said upper apices of said pleated construct.

4. A filter as set forth in claim 1 including a second open mesh sintered planar screen adjacent to said lower apices of said pleated construct.

5. A filter as set forth in claim 4 wherein said second open mesh planar ceramic screen is sintered to said lower apices of said pleated construct.

6. A filter as set forth in claim 4 wherein said second open mesh planar ceramic screen has a plurality of substantially rectangular shaped through openings.

7. A filter as set forth in claim 4 wherein said second open mesh planar ceramic screen has a plurality of substantially cylindrical shaped through openings.

8. A filter as set forth in claim 1 wherein said first open mesh planar ceramic screen has a plurality of substantially rectangular shaped through openings.

9. A filter as set forth in claim 1 wherein said first open mesh planar ceramic screen has a plurality of substantially cylindrical shaped openings.

10. A filter as set forth in claim 9 wherein said cylindrical shaped openings are coextensive with the surface area of said first open mesh planar ceramic screen.

11. A filter as set forth in claim 9 wherein said first open mesh planar ceramic screen has a base portion having opposed surfaces and a plurality of protrusions extending from at least one of said opposed surfaces and located between a plurality of said substantially cylindrical shaped through openings and having distal ends.

12. A filter as set forth in claim 11 including at least one additional open mesh planar ceramic screen having a surface resting on said first open mesh planar ceramic screen at the inlet side of said pleated construct of said filter.

13. A filter for removing solids from fluids, said filter comprising a stacked array of three dimensional, rigid pleated sintered ceramic constructs, wherein each construct has an inlet side, an outlet side and a plurality of adjacent angled walls having a sintered ceramic open mesh structure and opposed substantially parallel edges, said opposed substantially parallel edges of each of said angled walls being integral with an edge of an adjacent angled wall to form an apex, whereby said pleated ceramic construct has a plurality of adjacent angled walls joined at upper apices lying in a first plane and joined at lower apices lying in a second plane, wherein said first and second planes are substantially parallel, said filter further comprising a first open mesh planar sintered ceramic screen positioned adjacent to the upper apices of a first pleated construct in said stacked array, at least one open mesh planar sintered ceramic screen positioned between adjacent pleated constructs in said stacked array.

14. A filter as set forth in claim 13, wherein the open mesh structure of the pleated ceramic constructs have a pore size between 0.1 inch to 2.0 inches.

* * * * *

UNITED STATES PATENT AND TRADEMARK OFFICE
CERTIFICATE OF CORRECTION

PATENT NO. : 5,705,071
DATED : January 6, 1998
INVENTOR(S) : Jay M. Morris

It is certified that error appears in the above-identified patent and that said Letters Patent is hereby corrected as shown below:

Column 1 Line 21 "screenlike" should read --screen-like--.

Column 3 Line 62 "pleated portion 2" should read --pleated construct 2--.

Column 3, lines 63 and 65, "base construct 21" should read --base portion 21--.

Claim 4 Column 4 Line 54 after "sintered" insert --ceramic--.

Signed and Sealed this

Twenty-first Day of April, 1998

Attest:

BRUCE LEHMAN

*Attesting Officer*  *Commissioner of Patents and Trademarks*